N. NILSON.
TRACTION MACHINE.
APPLICATION FILED MAR. 6, 1915.

1,164,310.

Patented Dec. 14, 1915.
2 SHEETS—SHEET 1.

WITNESSES

INVENTOR
NILS NILSON
BY Paul & Paul
ATTORNEYS

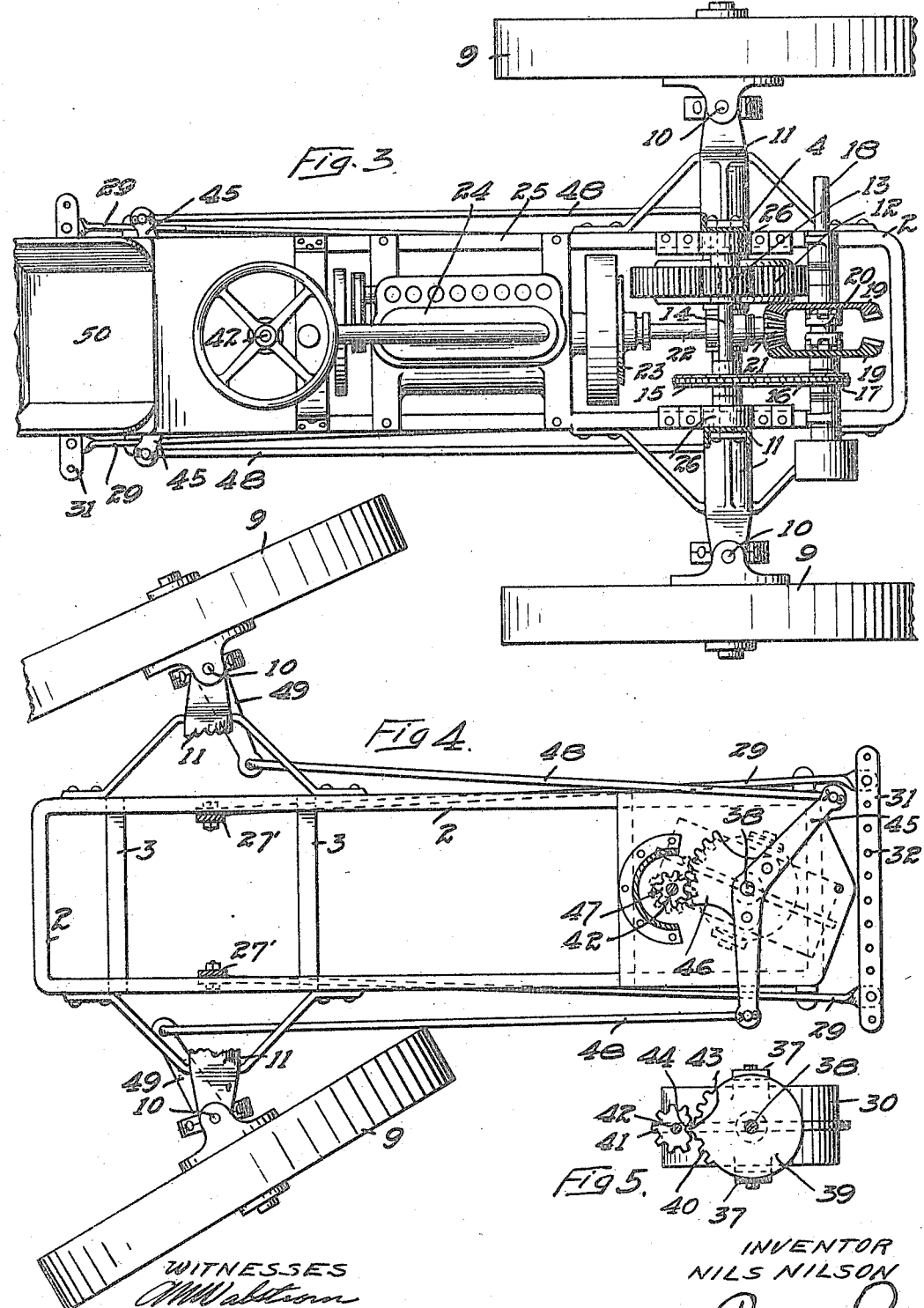

UNITED STATES PATENT OFFICE.

NILS NILSON, OF WAYZATA, MINNESOTA.

TRACTION-MACHINE.

1,164,310.  Specification of Letters Patent.  Patented Dec. 14, 1915.

Application filed March 6, 1915.  Serial No. 12,648.

*To all whom it may concern:*

Be it known that I, NILS NILSON, citizen of the United States, resident of Wayzata, county of Hennepin, State of Minnesota, have invented certain new and useful Improvements in Traction-Machines, of which the following is a specification.

My invention relates to traction machines for drawing plows and other agricultural implements and the object of the invention is to provide a draft connection which will tend to increase the traction of the machine.

A further object is to raise the fulcrum above the wheel for the purpose of reducing the diameter of the traction wheel.

Other objects of the invention will appear from the following detailed description.

The invention consists generally in various constructions and combinations, all as hereinafter described and particularly pointed out in the claims.

Figure 2:
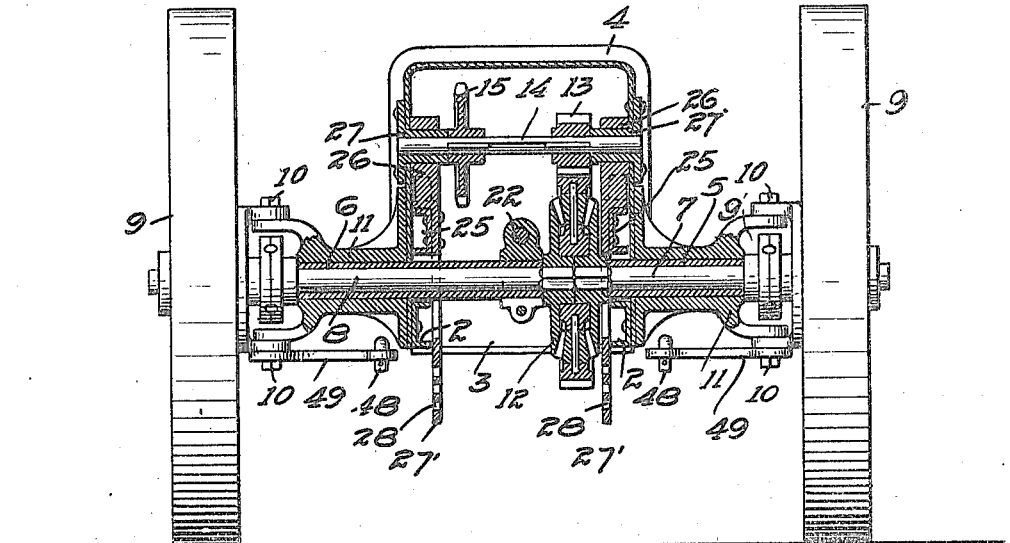
Figure 1:
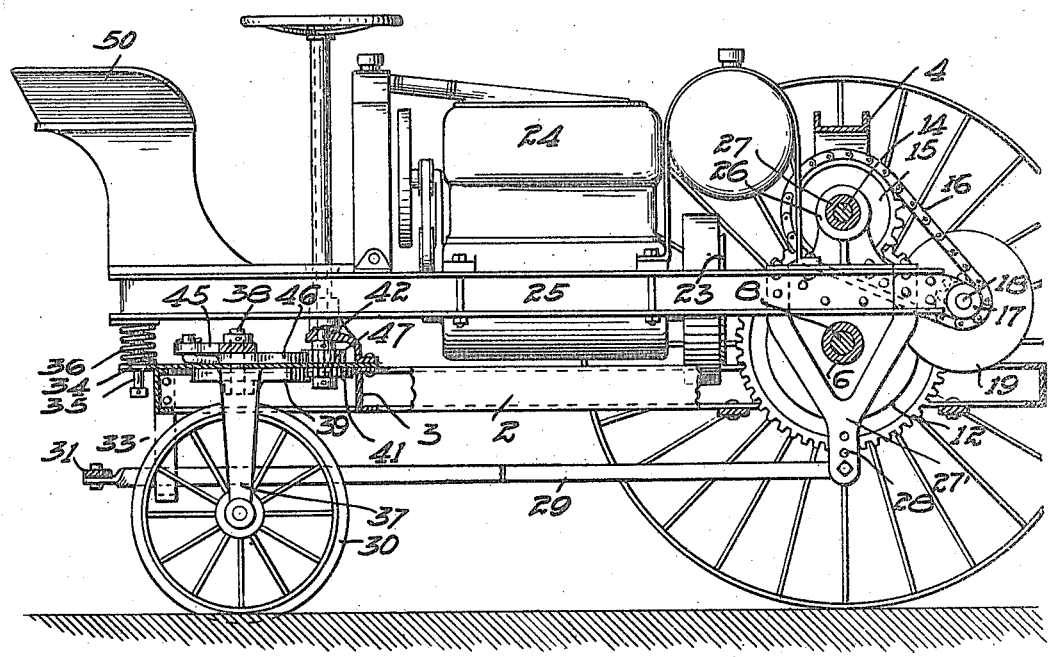

In the accompanying drawings forming part of this specification, Figure 1 is a longitudinal sectional view through a traction engine embodying my invention, Fig. 2 is a front elevation, partially in section, showing the driving mechanism of the machine, Fig. 3 is a plan view, Fig. 4 is a plan sectional view, illustrating the mechanism for steering the machine, Fig. 5 is a detail view.

In the drawing, 2 represents the frame of the machine, composed preferably of channel bar side rails having cross bars 3 at intervals. A yoke 4, U-shaped, substantially, in form, is secured to the frame 2 and projects upwardly therefrom and sleeves 5 and 6 are mounted transversely in said frame and yoke and have bearings for axle sections 7 and 8 therein. Traction and guiding wheels 9 have the usual pivotal connection at 10 for horizontal oscillation with hubs 11 that are mounted on the sleeves 5 and 6, the inner ends of said hubs being seated against the depending legs of the yoke 4. Suitable universal joint connections are provided at 9' between the pivots 10, through which power is transmitted to drive the wheels. This forward wheel drive is a feature of the machine to which I do not, in this application, make claim.

At the abutting ends of the axle sections 7 and 8 is a differential 12 having its gear meshing with a pinion 13 on a shaft 14 that is mounted in the upper portion of the yoke 4 and is driven through a sprocket wheel 15 and a belt 16 from a gear 17 on a counter shaft 18. Beveled gears 19 have clutch connections 20 with the shaft 18 and mesh with a pinion 21 on a driving shaft 22 which has clutch connections 23 with the shaft of an internal combustion engine 24 mounted on the middle portion of a superstructure frame 25. This superstructure frame has hangers 26 journaled on hubs 27 in which the shaft 14 is mounted.

Secured to the side rails of the frame 25 and depending below the frame 2 are Y-shaped hangers 27', the legs of which straddle the axle sections 7 and 8 and are rigidly secured to the rails of the frame 2, while their lower ends are provided preferably with a series of holes 28 for adjustable connection to draft bars 29 which extend rearwardly beneath the frame 2 upon each side of a caster wheel 30 and are connected at their rear ends with one another by a cross bar 31 having holes 32 at intervals therein. A support 33 for the rear ends of the draft bars is mounted to depend from the rear end of the frame 2. The backward pull on the draft bars will, through their connections with the hangers 27' and the frame 25, exert a downward pressure or pull on the traction wheels 9 and tend to raise the rear portion of the machine, thereby materially increasing the frictional engagement of the front wheels with the soil. The frame 25 may be compared to the weighing beam of a scale, its fulcrum being the shaft 14 and the load transmitted through the hangers 27' and draft bars 29 corresponding substantially to the scale rod of a scale. Strain on these bars tends to rock the superstructure frame 25 on its fulcrum, the weight of the engine parts thereon resisting this lifting action in much the same way as the poise on a scale resists the pull of the load on the platform. The frame 2 has a plate 34 at its rear end in which a bolt 35 mounted on the superstructure frame is slidable, a coiled spring 36 being arranged on said bolt and serving as a cushion for the superstructure frame, while the head of the bolt, engaging the underside of the frame, limits the upward movement of the superstructure. The caster wheel 30 has a fork 37 on which it is pivoted, the upper portion of the fork bearing on the underside of the plate 34 and pivotally connected therewith by a bolt 38. The fork is provided with a disk 39 having teeth 40 to mesh with the teeth of a pinion 41 on a post 42. The gear of the disk has a long tooth 43 adapted to enter a recess 44 in the pinion 41. As shown in Fig. 5 the pinion 41 will, because of the recess 44, allow a considerable oscillation of the steering post and the pinion 41 without affecting the disk 39 and the wheel 30, while the forward wheels 9 will be immediately affected by the rocking of the steering post. This provides for steering the machine on a side hill where it may be desirable to rock the forward wheels without changing the position of the rear wheel. When the steering post has been turned a predetermined distance, the pinion will engage the teeth 40 and oscillate the wheel 30 simultaneously with the movement of the forward wheels.

Above the plate 34 a bar 45 is centrally mounted on a bolt 38 and is provided with a rack 46 to mesh with a pinion 47 on the steering post, and the ends of the bar 45 are connected by rods 48 with arms 49 which are connected to the hubs on the forward traction wheels 9 to allow these wheels to be oscillated back and forth in a horizontal plane to steer the machine. A driver's seat 50 is mounted on the superstructure frame at the rear portion thereof near the steering wheel, where the weight may be utilized to resist the tendency to tilt the superstructure frame upwardly when the traction strain is applied to the forward portion of the machine.

With this machine the greater portion of the load, including the operating mechanism, will be carried by the forward or traction wheels, and when the machine is in use, the draft connections to the forward portion of the frame will tend to draw down on these wheels to increase their traction and at the same time tend to lift the rear portion of the machine and facilitate the oscillation of the caster wheel.

As shown in Fig. 4, the forward wheels are preferably set out a considerable distance from the frame, so that a comparatively wide range of oscillation is permitted to allow the machine to be turned in a small space.

In various ways the details of construction herein shown and described may be modified and still be within the scope of my invention.

I claim as my invention:

1. A traction machine comprising a frame having forward traction wheels and a rear caster wheel, said forward wheels having axle sections mounted in said frame, a yoke surmounting said axle sections, a differential on said axle sections, a shaft mounted in said yoke and geared to said differential, a counter shaft having a driving connection with a source of power, a driving connection between said counter shaft and said yoke shaft, hangers depending from said frame below said axle sections and draft bars extending rearwardly beneath said frame and attached to said hangers, the strain of said draft bars tending to lift the rear portion of said frame.

2. A traction machine comprising a frame having forward traction wheels and a rear caster wheel, an axle for said wheels mounted in said frame, a superstructure frame surmounting said first named frame, a shaft whereon the forward portion of said superstructure frame is fulcrumed, and draft means connected with the forward portion of said superstructure frame, the strain of said draft means tending to tilt the rear portion of said superstructure frame on its fulcrum and increase the traction of said forward wheels.

3. A traction machine comprising a frame having forward traction wheels and a rear guiding means, a superstructure frame having a fulcrum above the axis of said traction wheels and extending rearwardly over said machine frame and a draft bar connected with the forward portion of said superstructure frame below its fulcrum and operating to exert a downward pressure on said traction wheels and tending to lift the rear portion of said superstructure frame.

4. A traction machine comprising a frame having forward traction wheels and a rear guiding means, a superstructure frame having a fulcrum above the axis of said traction wheels and extending rearwardly over the rear portion of said machine frame, means connecting the rear portion of said superstructure frame with said machine frame and a draft means connected with the forward portion of said superstructure frame below its fulcrum and tending to increase the downward pressure of said traction wheels and exerting a lifting effect on the rear portion of said superstructure frame.

5. A traction machine comprising a frame having forward traction wheels and a rear guiding means, a yoke surmounting said frame, a shaft journaled in said yoke above the axis of said traction wheels, a superstructure frame fulcrumed on said shaft and extending rearwardly over said machine frame, draft means connected with the forward portion of said superstructure frame below the fulcrum thereof and operating to exert a lifting action on the rear portion of said superstructure frame and a downward pressure on said traction wheels.

In witness whereof, I have hereunto set my hand this 20th day of February, 1915.

NILS NILSON.

Witnesses:
  GENEVIEVE E. SORENSON,
  EDWARD A. PAUL.

Copies of this patent may be obtained for five cents each, by addressing the "Commissioner of Patents, Washington, D. C."